US011849880B2

(12) United States Patent
Ren et al.

(10) Patent No.: US 11,849,880 B2
(45) Date of Patent: Dec. 26, 2023

(54) APPLIANCE FOR MAKING A BEVERAGE AND ASSOCIATED METHOD, POWER MANAGEMENT SYSTEM AND MICROCONTROLLER READABLE MEDIUM

(71) Applicant: BREVILLE PTY LIMITED, Alexandria (AU)

(72) Inventors: Xiang Ren, Alexandria (AU); Con Psarologos, Bardwell Valley (AU)

(73) Assignee: BREVILLE PTY LIMITED, Alexandria (AU)

( * ) Notice: Subject to any disclaimer, the term of this patent is extended or adjusted under 35 U.S.C. 154(b) by 626 days.

(21) Appl. No.: 16/762,477

(22) PCT Filed: Nov. 7, 2018

(86) PCT No.: PCT/AU2018/000217
§ 371 (c)(1),
(2) Date: May 7, 2020

(87) PCT Pub. No.: WO2019/090381
PCT Pub. Date: May 16, 2019

(65) Prior Publication Data
US 2020/0260905 A1    Aug. 20, 2020

(30) Foreign Application Priority Data
Nov. 7, 2017    (AU) ................. 2017904512

(51) Int. Cl.
*A47J 31/52* (2006.01)
*A47J 27/21* (2006.01)
(Continued)

(52) U.S. Cl.
CPC ....... *A47J 31/525* (2018.08); *A47J 27/21008* (2013.01); *A47J 31/30* (2013.01); *A47J 31/545* (2013.01)

(58) Field of Classification Search
CPC ...... A47J 31/44; A47J 31/469; A47J 31/4403; A47J 31/24
See application file for complete search history.

(56) References Cited

U.S. PATENT DOCUMENTS 3,585,921 A  *  6/1971  Khaja .................. A47J 31/053
                                              99/280
4,572,113 A  *  2/1986  Baughman ............ F24H 9/2007
                                              122/507

(Continued)

FOREIGN PATENT DOCUMENTS

CN    101721116 A    6/2010
CN    103874439 A    6/2014
(Continued)

OTHER PUBLICATIONS

International Search Report on Application No. PCT/AU2018/000217 dated Jan. 24, 2019.

(Continued)

*Primary Examiner* — Sean M Michalski
(74) *Attorney, Agent, or Firm* — Quarles & Brady LLP

(57) ABSTRACT

An appliance for making a beverage, the appliance comprising: a plurality of heating components for heating a liquid, and a power management system, wherein the power management system comprises: an energy storage device, wherein at least a first function of the appliance requires simultaneous operation of a first heating component and a second heating component of the plurality of heating components, and wherein at least the first heating component comprises a first heater element and a second heater element, where the first heater element is powered using mains power, and the second heater element is powered using the energy storage device.

19 Claims, 7 Drawing Sheets

(51) Int. Cl.
*A47J 31/30* (2006.01)
*A47J 31/54* (2006.01)

(56) References Cited

U.S. PATENT DOCUMENTS

| | | | |
|---|---|---|---|
| 4,825,759 A * | 5/1989 | Grome | A47J 31/0573 |
| | | | D7/312 |
| 4,920,252 A * | 4/1990 | Yoshino | G05D 23/1934 |
| | | | 219/486 |
| 5,408,917 A | 4/1995 | Lussi | |
| 10,236,544 B2 * | 3/2019 | Bulgajewski | H05B 3/56 |
| 11,006,779 B2 * | 5/2021 | Juve | A47J 31/467 |
| 11,089,900 B2 * | 8/2021 | Knip | A47J 31/4489 |
| 11,317,758 B2 * | 5/2022 | Beschi | A47J 31/54 |
| 11,337,548 B2 * | 5/2022 | Herrmann | A47J 31/5251 |
| 2004/0145466 A1 * | 7/2004 | Anthony | G08B 17/107 |
| | | | 340/584 |
| 2010/0096381 A1 | 4/2010 | Albert et al. | |
| 2012/0111855 A1 * | 5/2012 | Provoost | H05B 6/14 |
| | | | 219/661 |
| 2014/0069279 A1 * | 3/2014 | Upston | A47J 31/44 |
| | | | 99/283 |
| 2015/0305551 A1 * | 10/2015 | Rosati | A47J 31/56 |
| | | | 99/280 |
| 2017/0325621 A1 * | 11/2017 | Herbert | A47J 31/521 |
| 2019/0000263 A1 * | 1/2019 | Knip | A23L 2/54 |
| 2019/0069713 A1 * | 3/2019 | Dees | F25D 31/002 |
| 2022/0400891 A1 * | 12/2022 | Zoppas | A47J 31/60 |
| 2023/0034233 A1 * | 2/2023 | Loopstra | A47J 31/0663 |
| 2023/0044801 A1 * | 2/2023 | Tibbe | A47J 31/525 |

FOREIGN PATENT DOCUMENTS

| | | |
|---|---|---|
| CN | 205002350 U | 1/2016 |
| CN | 205119443 U | 3/2016 |
| CN | 206160458 U | 5/2017 |
| EP | 2625989 A1 | 8/2013 |
| EP | 3311451 A1 | 4/2018 |
| GB | 2536000 A | 9/2016 |
| JP | H11281155 A | 10/1999 |
| WO | WO-2006/102980 A1 | 10/2006 |
| WO | WO-2012151629 A1 | 11/2012 |
| WO | WO-2016138968 A1 | 9/2016 |
| WO | WO-2016/205569 A1 | 12/2016 |
| WO | WO-2019051529 A1 | 3/2019 |

OTHER PUBLICATIONS

European Search Report dated Jun. 22, 2021 for application No. EP18875174.7.

* cited by examiner

APPLIANCE FOR MAKING A BEVERAGE AND ASSOCIATED METHOD, POWER MANAGEMENT SYSTEM AND MICROCONTROLLER READABLE MEDIUM

TECHNICAL FIELD

The present invention relates generally to an appliance for making a beverage, a power management system for the appliance, a method for controlling an appliance and a microcontroller readable medium.

BACKGROUND

Domestic appliances designed to make beverages, such as automatic tea makers and espresso machines, generally operate using the power that is available from the main power supply to which the appliance is connected.

The bulk of the power requirements are for heating up heating components in order to carry out certain functions such as heating water for creating espresso, heating water to generate steam and heating water for the provision of hot water. Heaters may also be used to heat up other liquids as well in order to make a beverage.

At times, depending on which country or location the appliance is being used, the power available via the main domestic power supply, or indeed any other provided power supply, may not be sufficient to enable one or more functions to be selected that utilise two heaters at the same time. For example, in the U.S.A., the domestic mains power supply provides a power source with a maximum power output of 1800 Watts. Whereas, in Australia, the maximum power output from the domestic mains power supply is 2400 Watts. Therefore, the user is required to carry out multiple concurrent steps in order to make their chosen beverage.

SUMMARY

It is an object of the present invention to substantially overcome, or at least ameliorate, one or more disadvantages of existing arrangements.

Disclosed are arrangements which seek to address one or more of the above problems by providing an appliance for making a beverage, a power management system for the appliance, a method for controlling the appliance and a microcontroller readable medium that enable multiple heating components to be utilised concurrently.

According to a first aspect of the present disclosure, there is provided an appliance for making a beverage, the appliance comprising: a plurality of heating components for heating a liquid, and a power management system, wherein the power management system comprises: an energy storage device, wherein at least a first function of the appliance requires simultaneous operation of a first heating component and a second heating component of the plurality of heating components, and wherein at least the first heating component comprises a first heater element and a second heater element, where the first heater element is powered using mains power, and the second heater element is powered using the energy storage device.

According to a second aspect of the present disclosure, there is provided a power management system for use in an appliance for making a beverage, wherein the appliance has a plurality of heating components for heating a liquid, the power management system comprising: a controller, and an energy storage device, wherein the controller is arranged to determine that at least a first function of the appliance has been selected requiring simultaneous operation of a first heating component and a second heating component of the plurality of heating components, and upon a positive determination, further arranged to apply mains power to a first heater element of the first heating component and apply power from the energy storage device to a second heater element of the first heating component.

According to a third aspect of the present disclosure, there is provided a method of controlling the provision of power in an appliance for making a beverage, wherein the appliance has a plurality of heating components for heating a liquid, the method comprising the steps of: determining that at least a first function of the appliance has been selected requiring simultaneous operation of a first heating component and a second heating component of the appliance, and upon a positive determination, applying mains power to a first heater element of the first heating component, and applying power from the energy storage device to a second heater element of the first heating component.

According to a fourth aspect of the present disclosure, there is provided a microcontroller readable medium for use in an appliance for making a beverage, wherein the appliance has a plurality of heating components for heating a liquid, the microcontroller readable medium having a program recorded thereon, where the program is configured to make a microcontroller execute a procedure to: determine that at least a first function of the appliance has been selected requiring simultaneous operation of a first heating component and a second heating component of the plurality of heating components, and upon a positive determination, apply mains power to a first heater element of the first heating component and apply power from the energy storage device to a second heater element of the first heating component.

Other aspects are also disclosed.

BRIEF DESCRIPTION OF THE DRAWINGS

At least one embodiment of the present invention will now be described with reference to the drawings and appendices, in which.

DETAILED DESCRIPTION INCLUDING BEST MODE

Although the herein described embodiments relate to water heating appliances for making a beverage, it will be understood that the appliance may be used to heat up other suitable potable liquids, or mixtures of liquids, for making beverages.

Further, it will be understood that the appliance may be any suitable appliance such as a manual espresso appliance, a capsule espresso appliance or an automatic espresso appliance.

The following described embodiments relate to a coffee maker that includes operations such as making an espresso, generating steam, and the provision of hot water. The generated steam may be used to froth milk. The hot water that is provided may be used to add to the espresso. A user may select a function via a user interface, where a function is one or more of these operations. For example, one function may be to produce a single espresso shot while at the same time, produce steam to heat up and froth milk. Another function may be to produce two separate espresso shots at the same time. Another function may be to produce an espresso shot at the same time as providing heated water.

It will be understood that the described components and processes may be implemented in other appliances designed to make beverages such as, for example, a tea maker and the like. It will also be understood that the described components and processes may be implemented to enable liquids other than water to be heated up by the heating components in the appliance.

Figure 1A:
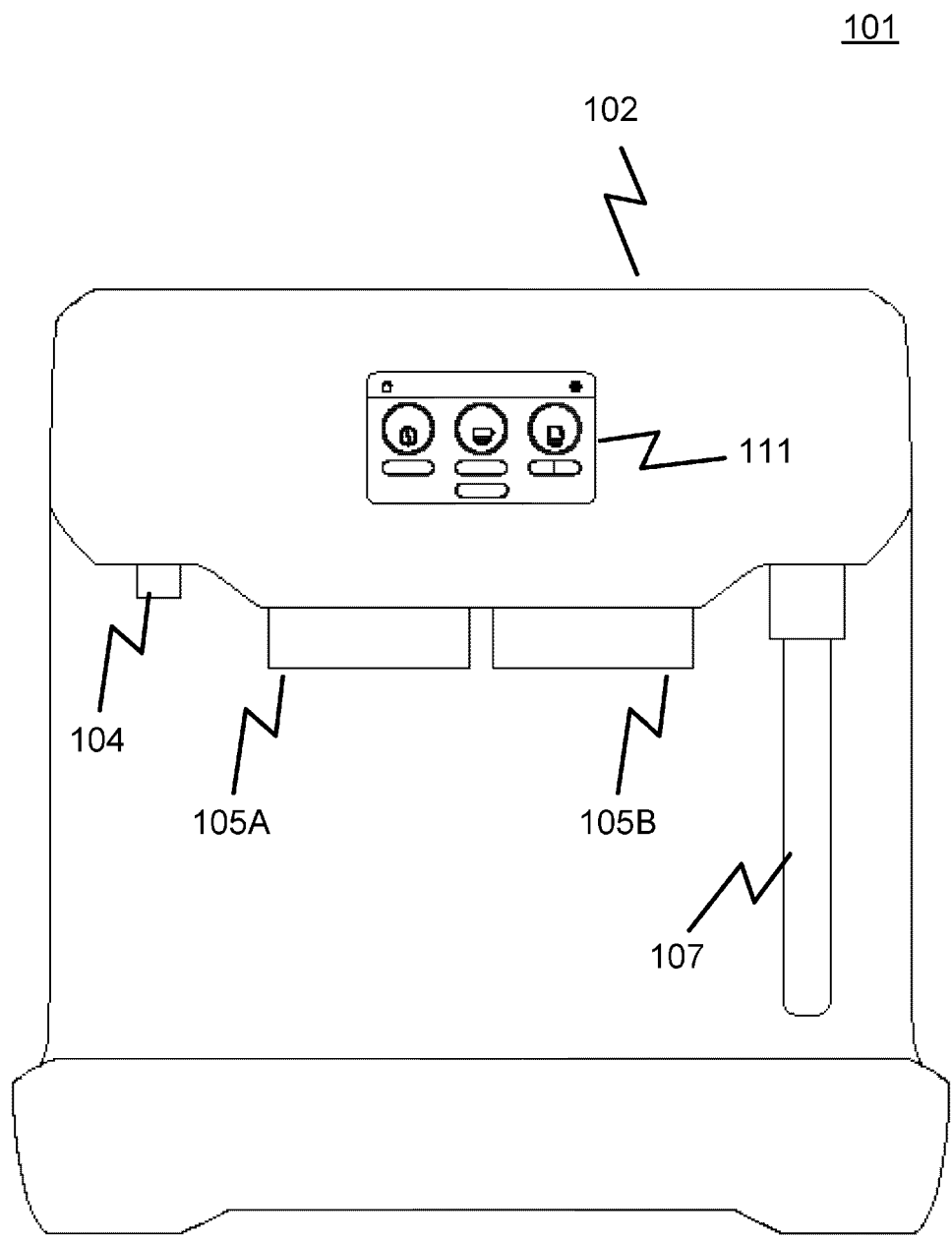
FIGS. 1A and 1B show an appliance for making a beverage in the form of a coffee machine according to the present disclosure.
Figure 1B:
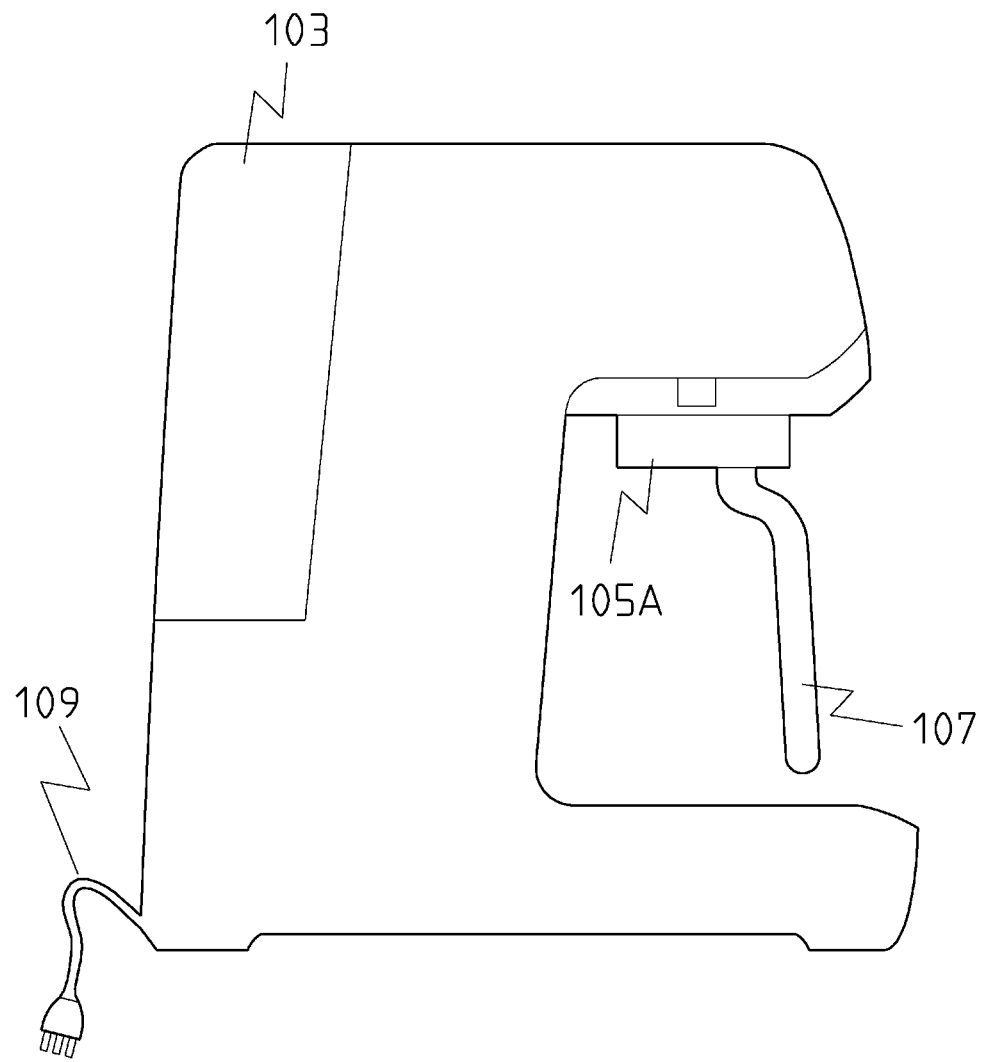

FIGS. 1A and 1B show an appliance in the form of a coffee (e.g. espresso) maker 101.

The coffee maker 101 has a body 102 incorporating various components required to make a coffee. These components include a water tank 103 that is used to store water for use by the appliance. Item 104 represents a water outlet, or tap, for expressing hot water. In this example, the coffee maker has two coffee outlets (105A, 105B), where each may be used as an output for the espresso coffee or hot water. Each coffee outlet is associated with a group head. In this example, a portafilter may be attached to one or both of the group heads in order to extract the coffee. A steam wand 107 is provided for the output of generated steam. The appliance has a mains power lead 109 via which the appliance obtains mains power through a mains outlet. A user interface 111 is provided via which a user may select one or more functions of the coffee maker 101.

A first function may involve a first operation that produces a single espresso shot from the first group head connected to the first coffee outlet 105A while simultaneously involving a second operation that produces steam via the steam wand 107 to heat up and froth milk. A further function may involve a first operation that produces a first espresso shot from the first group head connected to the first coffee outlet 105A while simultaneously involving a second operation that produces a second espresso shot from the second group head connected to the second coffee outlet 105B. Another function may involve a first operation that produces an espresso shot from the first group head connected to the first coffee outlet 105A while, at the same time, may involve a second operation that provides heated water via the water outlet 104.

It will be understood that alternative appliances may have more than two group heads or coffee outlets, and may have more than one water outlet or steam wand.

Figure 2:
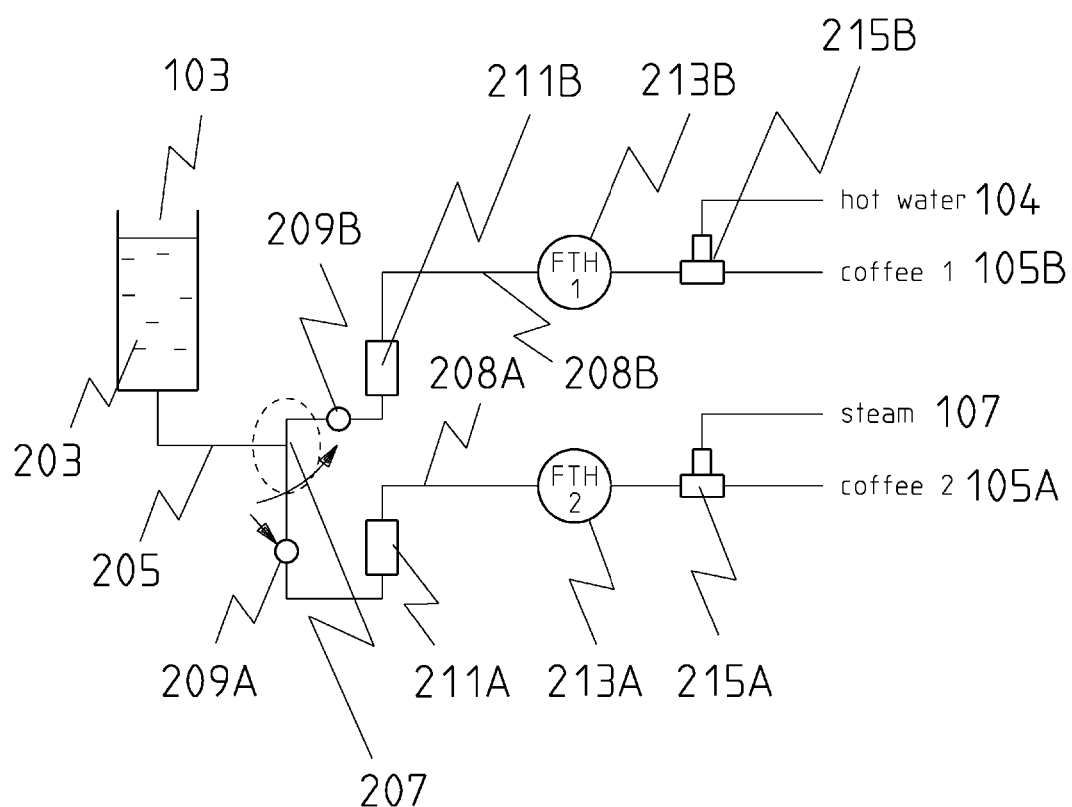
FIG. 2 shows a hydraulic system diagram for liquid being used in the appliance of FIGS. 1A and 1B according to the present disclosure.

FIG. 2 shows a hydraulic system 201 for liquid being used in the coffee maker 101. In this example, the liquid is water. However, it will be understood that alternative liquids other than water may be used.

The water tank 103 holds cold water 203. A common hydraulic line 205 feeds the cold water 203 to a first hydraulic line 208A and a second hydraulic line 208B via a T-fitting 207.

In the first hydraulic line 208A, the cold water passes through a flow meter 209A by way of operation of a water pump 211A. The cold water 203 is passed through a heating component 213A to generate hot water. The hot water is provided to an E-valve 215A in the form of a T-valve that is connected to a microcontroller. The microcontroller controls the flow of water through the valve so that the water either flows into the coffee line via the group head to the coffee outlet 105A or the steam wand 107. After the E-valve 215A, which is a one directional valve, the water may therefore be used to either generate steam or produce an espresso shot.

In the second hydraulic line 208B, the cold water passes through a flow meter 209B by way of operation of a water pump 211B. The cold water 203 is passed through a heating component 213B to generate hot water. The hot water is provided to the second group head 105B via an E-valve 215B in the form of a T-valve that is connected to a microcontroller. The microcontroller controls the flow of water through the valve so that the water either flows into the coffee line via the group head to the coffee outlet 105B or the hot water outlet 104. After the E-valve 215B, which is a one directional valve, the water may therefore be used to either produce hot water or produce an espresso shot.

Figure 3:
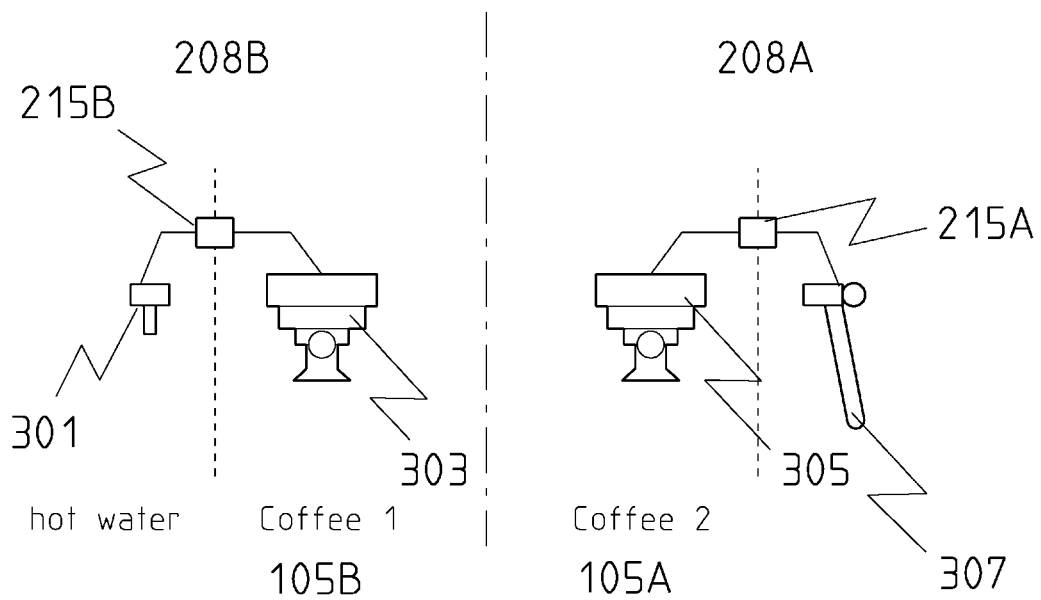
FIG. 3 shows two group heads for use in the appliance of FIGS. 1A and 1B according to the present disclosure.

FIG. 3 shows further details of the two outputs from the hydraulic lines (208A, 208B) used in the coffee maker 101. The hot water provided via the first hydraulic line 208A passes through the E-valve 215A to either the group head (espresso coffee generator) 305 to the coffee outlet 105A or the steam wand 307 to generate steam. The hot water provided via the second hydraulic line 208B passes through the E-valve 215B to either the group head (espresso coffee generator) 303 to the coffee outlet 105B or the hot water outlet 301.

Figure 4A:
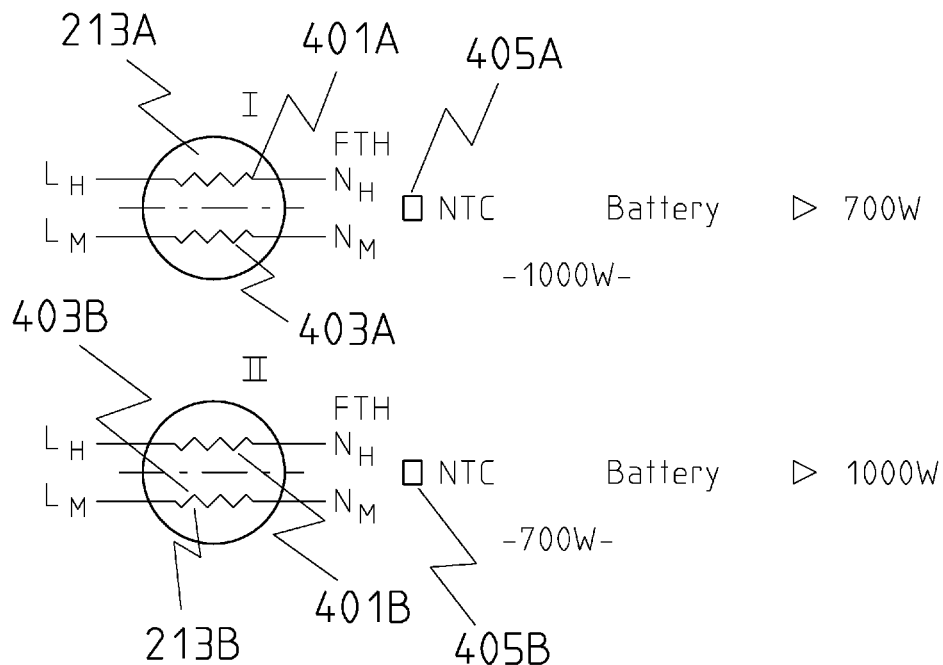
FIGS. 4A and 4B show heating components with multiple heating elements for use with the appliance of FIGS. 1A and 1B according to the present disclosure.
Figure 4B:
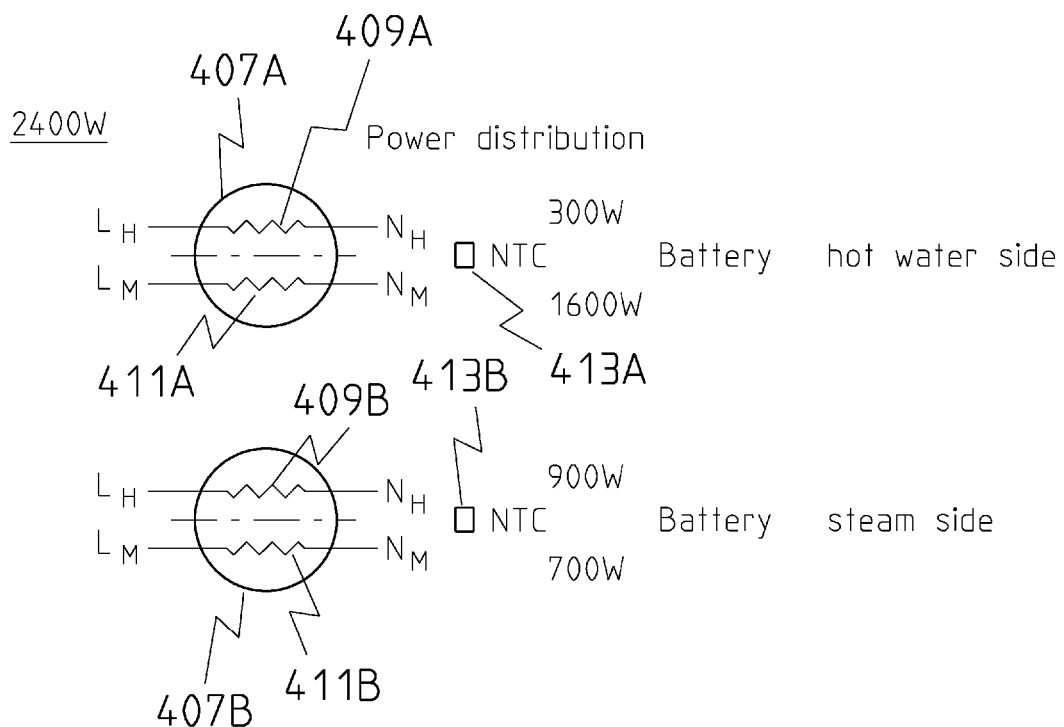

FIGS. 4A and 4B show heating components with multiple heating elements for use with the coffee maker 101.

As shown in FIG. 4A, a first heating component 213A includes a first heater element 401A and a second heater element 403A. The first heater element 401A is powered via an energy storage device (see FIG. 5). The second heater element 403A is powered via the mains power. This arrangement is suitable for use in regions that provide a mains power output up to 1800 W. The heater elements are resistive tracks. The first and second heater elements may be interleaved.

According to one example, the energy storage device includes a plurality of capacitor banks and has associated with it one or more control switches, as will be explained in more detail below. According to an alternative example, the energy storage device may include one or more battery storage devices, where the device has associated with it one or more control switches. Therefore, the energy storage device may include a capacitor, a capacitor bank, a super capacitor, a super capacitor bank, or a battery. It will be understood that any suitable form and power quantity of energy storage may be used.

A first control switch is controlled by the controller to charge the bank of capacitors. A second switch is controlled by the controller to discharge the bank of capacitors into, i.e. apply power to, the load. The switches are controlled by the controller using an XOR (exclusive OR) operation to ensure that both switches are never open or closed at the same time.

In this example, the energy storage device provides up to 700 W of power to the first heater element 401A, while the mains power provides up to 1000 W of power to the second heater element 403A. This arrangement is suitable for use in regions that provide a mains power output up to 1800 W. 1700 W is provided from the mains to heat the two second heater elements (403A, 403B) with the remaining 100 W being made available for other functions of the coffee maker, such as the electronics.

A negative temperature coefficient (NTC) sensor 405A is provided to measure the temperature of the first heating component 213A.

Also shown in FIG. 4A is a second heating component 213B that includes a first heater element 401B and a second heater element 403B. The first heater element 401B is powered via the same energy storage device (see FIG. 5). The second heater element 403B is powered via the mains power.

In this example, the energy storage device provides up to 1000 W of power to the first heater element 401B, while the mains power provides up to 700 W of power to the second heater element 403B.

A negative temperature coefficient (NTC) sensor 405B is provided to measure the temperature of the second heating component 213B.

FIG. 4B shows an alternative arrangement for use in regions that provide a mains power output of up to 2400 W. A first heating component 407A includes a first heater element 409A and a second heater element 411A. The first heater element 409A is powered via an energy storage device (see FIG. 5). The second heater element 411A is powered via the mains power.

Again, the energy storage device includes a plurality of capacitor banks and has associated with it one or more control switches, as will be explained in more detail below. According to an alternative example, the energy storage device may include one or more battery storage devices, where the device has associated with it one or more control switches. Therefore, the energy storage device may include a capacitor, a capacitor bank, a super capacitor, a super capacitor bank, or a battery. It will be understood that any suitable form of energy storage may be used.

A first control switch is controlled by the controller to charge the bank of capacitors. A second switch is controlled by the controller to discharge the bank of capacitors into, i.e. apply power to, the load. The switches are controlled by the controller using an XOR (exclusive OR) operation to ensure that both switches are never open or closed at the same time.

In this example, the energy storage device provides up to 300 W of power to the first heater element 409A, while the mains power provides up to 1600 W of power to the second heater element 411A.

A negative temperature coefficient (NTC) sensor 413A is provided to measure the temperature of the first heating component 407A.

Also shown in FIG. 4B is a second heating component 407B that includes a first heater element 409B and a second heater element 411B. The first heater element 409B is powered via the same energy storage device (see FIG. 5). The second heater element 411B is powered via the mains power.

In this example, the energy storage device provides up to 900 W of power to the first heater element 409B, while the mains power provides up to 800 W of power to the second heater element 411B.

A negative temperature coefficient (NTC) sensor 413B is provided to measure the temperature of the second heating component 409B.

This arrangement is suitable for use in regions that provide a mains power output up to 2400 W. 2300 W is provided from the mains to heat the two second heater elements (411A, 411B) with the remaining 100 W being made available for other functions of the coffee maker, such as the electronics.

Figure 5:
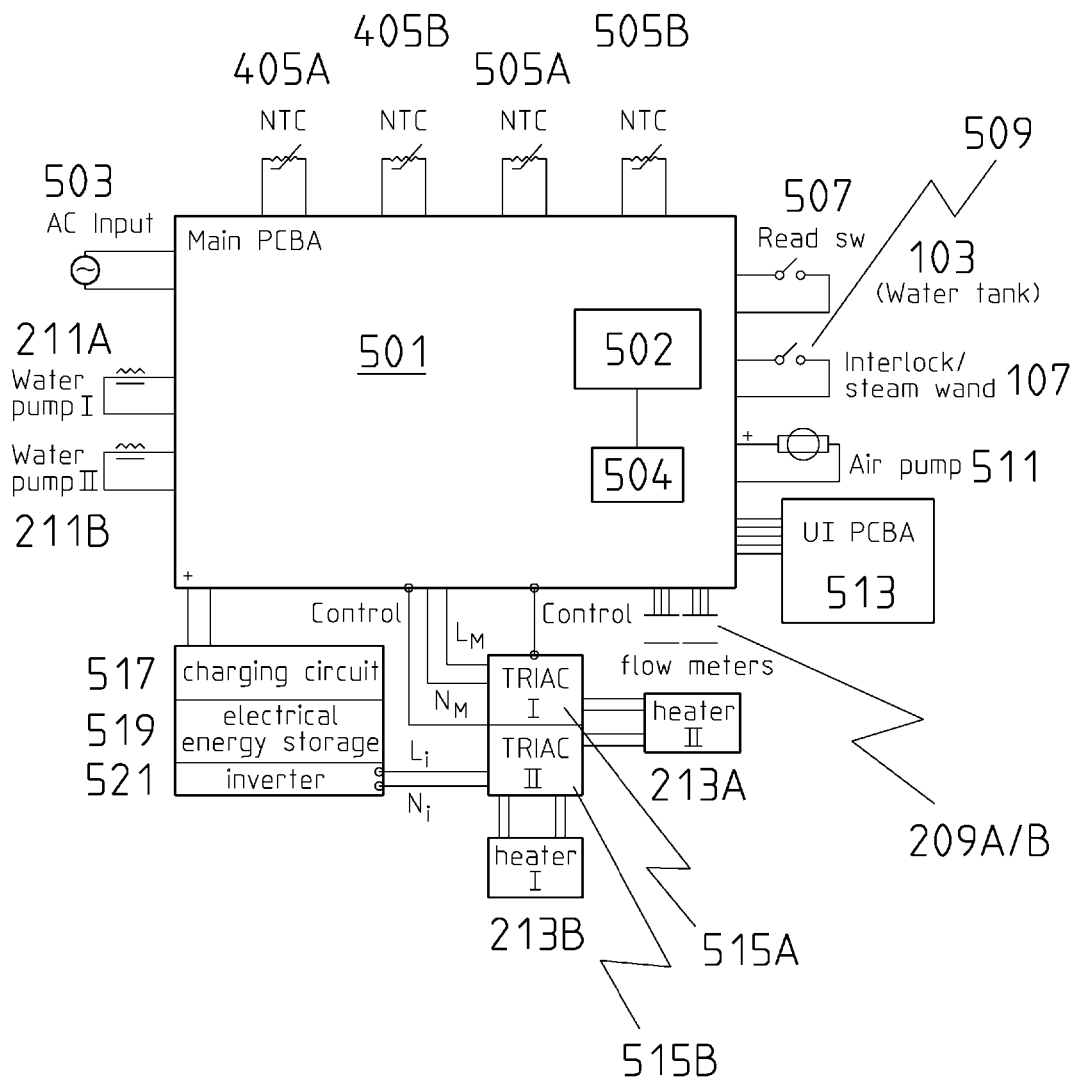
FIG. 5 shows a system block diagram for use in the appliance of FIGS. 1A and 1B according to the present disclosure.

FIG. 5 shows a system block diagram for use in the coffee maker 101.

A main PCBA (printed circuit board assembly) 501 is provided with a microcontroller 502 that is arranged to control the various processes based on instructions that are stored in memory 504. The memory may be, for example, a ROM or EEPROM. It will be understood that there are control lines between the microcontroller 502 and the other components of the coffee maker as appropriate to enable full operation of the coffee maker.

The memory 504 is a microcontroller readable medium.

Mains power 503 is provided to the main PCBA 501. As described in FIGS. 4A and 4B, two NTC's (405A, 405B) are connected to the two heating components (213A, 213B) for temperature detection. Two further NTC's (505A, 505B) are connected to the water paths located at the end of each of the group heads (105A, 105B).

A reed switch 507 is used to provide a signal to the controller 502 to indicate when the water tank 103 inside the coffee machine 101 is empty.

An interlock switch 509 is provided to indicate to the controller 502 whether the steam wand 307 has been lifted from its "steam" configuration. If the steam wand 307 has been lifted from the "steam" configuration, then the controller 502 controls the E-valve 215A to ensure that steam stops flowing into the steam wand 307 to reduce the risk of scalding the user.

A user interface (UI) PCBA 513 is provided as a user interface, such as an LCD interface to enable a user to control the function(s) of the coffee maker 101. For example, one or more control signals may be generated at the UI when a user selects a particular operation or function. This control signal(s) is communicated back to the main PCBA 501 to the controller 502 to enable the controller 502 to control the various components of the system dependent on the generated control signal(s).

The two water pumps (211A, 211B) are also controlled by the controller 502 to pump fluids into and through the heater elements of the heating components. The flow of fluid is measured by the two flow meters (209A, 209B).

The heater elements of the heating components (213A, 213B) are controlled by circuits including TRIAC switching devices (515A, 515B). A charging circuit 517 controls how the energy storage device (e.g. battery) 519 is charged. An inverter 521 is provided to convert DC into AC for applying power to the heater elements.

Figure 6:
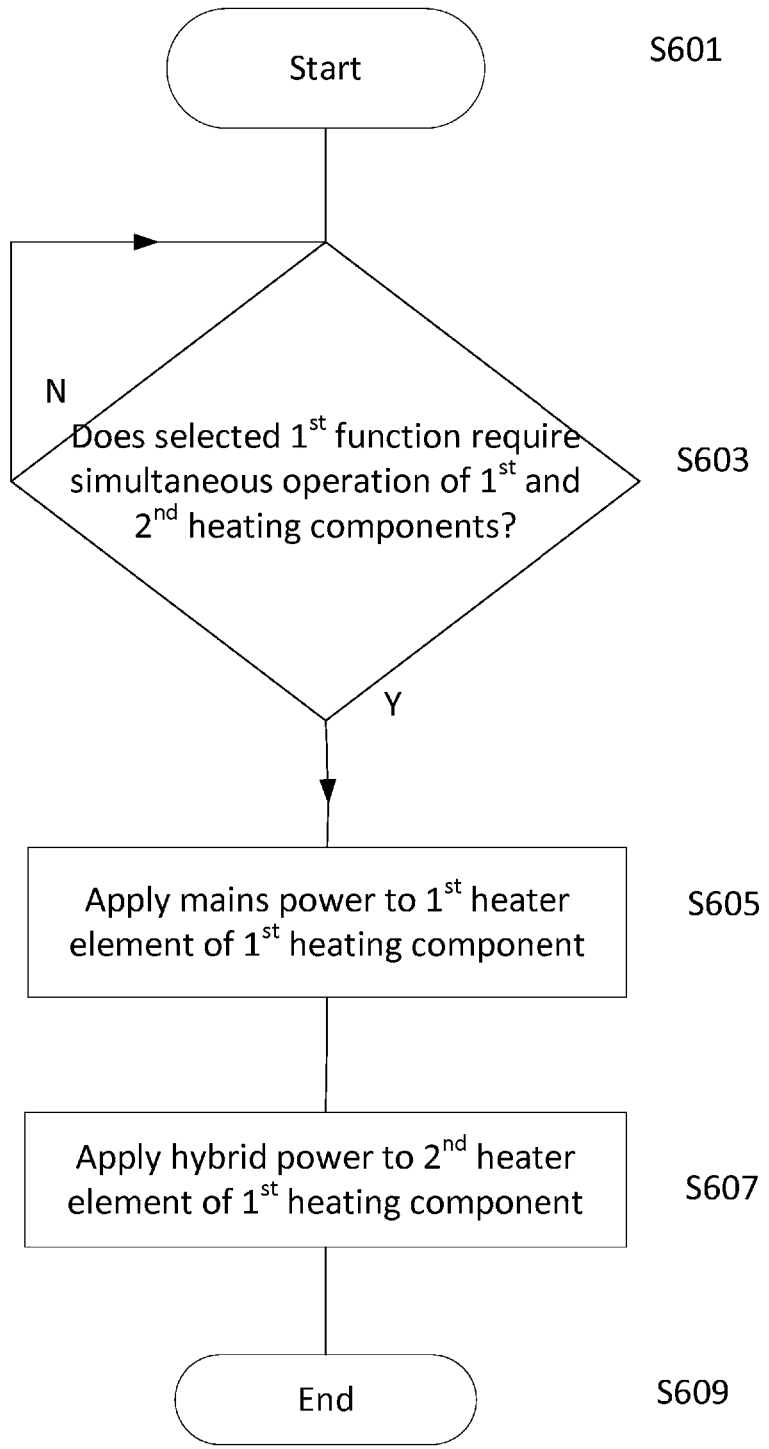
FIG. 6 shows a process flow diagram for use in the appliance of FIGS. 1A and 1B according to the present disclosure.

FIG. 6 shows a process flow diagram for use in the coffee maker 101.

The process starts at step S601. At step S603, the controller 502 makes a determination as to whether one or more functions selected by the user on the user interface requires simultaneous operation of the first and second heating components (213A, 213B). That is, a determination is made as to whether one or more functions selected by the user on the user interface requires simultaneous operation of two separate heating components where a first heating component is located in a first hydraulic line and a second heating component is located in a second (i.e. different) hydraulic line.

Upon a negative determination, the controller continues to monitor the operation of the coffee machine 101 via the user interface.

Upon a positive determination, the process moves to step S605 where the controller causes mains power to be applied to a first heater element of the first heating component.

After step S605, the process moves to step S607 where the controller causes hybrid power from the energy storage device 519 to be applied to a second heater element of the first heating component.

The process then ends at step S609.

With the process shown in FIG. 6, it will be understood that the power being applied by the energy storage device 519 to the first heating component is sufficient to enable the remaining mains power to be used to power the second heating component. This would then enable both the first and second heating components to be heated up simultaneously.

It will be understood that alternatively a similar process may be carried out to power the first and second heater elements of the second heating component in a similar manner at the same time as the heater elements of the first heating component.

Therefore, the following simultaneous combinations of operations are provided. Function 1: Coffee (hydraulic line 1)+Milk frothing (hydraulic line 2). Function 2: Coffee (hydraulic line 1)+coffee (hydraulic line 2). Function 3: Coffee (hydraulic line 2)+hot water (hydraulic line 2).

For example function 1 is selected via the user interface as the user wants to create a cappuccino. This requires extraction of the coffee from a porta filter into a cup and simultaneous frothing of milk. Thus the two heaters in the two hydraulic lines need to be activated simultaneously. As an example, 1700 watts of power (as a combination of energy storage power and mains power) may be supplied to a first heating component for the hydraulic line providing the coffee in order to extract the coffee, and 1700 watts of power (as a combination of energy storage power and mains power) may be provided to a second heating component in the other hydraulic line to mix with the air with a venturi pump and provide steam out of steam wand.

This makes the coffee experience for the user faster and more convenient.

The energy storage device 519 is provided with associated control circuitry that communicates with the microcontroller 502. The control lines may, for example, indicate a charge status of the energy storage device. If the energy storage device is not charged up to a threshold amount, the microcontroller 502 may disable certain operations when selected by a user, or disable entire functions.

The energy storage device and associated control circuitry may be located inside the body of the appliance, or may be integrated with the body of the appliance.

The main PCBA 501 and associated components (e.g. the energy storage device 519, the controller 502, the UI PCBA 513) form a power management system for controlling how the coffee maker heats up the water.

The power management system uses the controller 502 to control when power is applied to each of the heater elements dependent on the operation or function selected and the charge status of the energy storage device.

According to a mode of operation, when the appliance is not being used to heat a liquid, e.g. it is in standby mode, the energy storage device is charged up under control of the controller 502. Control signals are fed back to a display on the UI to inform the user of the percentage of the charge of the energy storage device.

As mentioned, herein, any suitable forms of energy storage may be used to form the energy storage device 519. In this example, the energy storage system 519 is a battery. However, it may also utilise capacitors as these have a faster rate of charge and discharge when compared to battery technology.

It will be understood that the processes described herein for applying power from multiple power sources to different loads could also relate to processes where power from multiple power sources is applied to loads other than heater elements, such as loads that are motors (e.g. grinder motors) etc.

INDUSTRIAL APPLICABILITY

The arrangements described are applicable to liquid heating appliance industries and particularly for industries that manufacture liquid heating appliances for making a beverage.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. An appliance for making a beverage, the appliance comprising:
   a plurality of heating components for heating a liquid, and
   a power management system comprising an energy storage device,
   wherein at least a first function of the appliance requires simultaneous operation of a first heating component and a second heating component of the plurality of heating components,
   wherein at least the first heating component comprises a first heater element that is powered using a first portion of mains power and a second heater element that is powered using the energy storage device, and
   wherein the second heating component is powered using at least a second portion of the mains power.

2. The appliance of claim 1, wherein the second heating component comprises a third heater element and a fourth heater element, and
   wherein, during the simultaneous operation of the first and second heating components, the third heater element is powered using the second portion of the mains power and the fourth heater element is powered using the energy storage device.

3. The appliance of claim 1 further comprising a plurality of hydraulic lines including at least a first hydraulic line that includes the first heating component for heating the liquid and a second hydraulic line that includes the second heating component for heating the liquid.

4. The appliance of claim 3 further comprising a plurality of group heads including at least a first group head positioned at an output of the first hydraulic line and a second group head positioned at an output of the second hydraulic line.

5. The appliance of claim 3 further comprising a plurality of water pumps including at least a first water pump in the first hydraulic line and a second water pump in the second hydraulic line.

6. The appliance of claim 3 further comprising a plurality of valves including at least a first valve in the first hydraulic line and a second valve in the second hydraulic line.

7. The appliance of claim 1, wherein the power management system further comprises a controller, the controller being configured to:
   determine that the first function has been selected requiring simultaneous operation of the first heating component and the second heating component, and
   upon a positive determination, to apply mains power to the first heater element and apply power from the energy storage device to the second heater element.

8. The appliance of claim 1, wherein a simultaneous operation of the first function with a further function of the appliance requires the simultaneous operation of the first heating component and the second heating component.

9. The appliance of claim 1, wherein the energy storage device comprises at least one of a capacitor, a capacitor bank, a super capacitor, a super capacitor bank, or a battery.

10. The appliance of claim 1, wherein the first function comprises actions including one of: simultaneous extraction of a first espresso shot with the first heating component and extraction of a second espresso shot with the second heating component simultaneous extraction of the first espresso shot with the first heating component and generation of steam with the second heating component or simultaneous provision of hot water with the first heating component and extraction of the first espresso shot with the second heating component.

11. The appliance of claim 1, wherein the mains power is a commercial alternating current (AC) power supply having a predetermined supply voltage, and
   wherein the power available via the mains power is insufficient to simultaneously power the first and second heating components without utilizing power from the energy storage device.

12. A power management system for use in an appliance for making a beverage, wherein the appliance has a plurality of heating components for heating a liquid, the power management system comprising:
   a controller; and
   an energy storage device,
   wherein the controller is configured to:
      determine whether at least a first function of the appliance has been selected requiring simultaneous operation of a first heating component and a second heating component of the plurality of heating components, and
      upon a positive determination, to apply a first portion of mains power to a first heater element of the first heating component, apply power from the energy storage device to a second heater element of the first heating component, and apply at least a second portion of the mains power to the second heating component.

13. The power management system of claim 12, wherein the controller is further configured to:
   determine that at least the first function of the appliance has been selected requiring simultaneous operation of the first heating component and the second heating component, and
   upon a positive determination, to apply the second portion of the mains power to a third heater element of the second heating component and apply power from the energy storage device to a fourth heater element of the second heating component.

14. The power management system of claim 12, wherein the first function comprises actions including one of: simultaneous extraction of a first espresso shot with the first heating component and extraction of a second espresso shot with the second heating component simultaneous extraction of the first espresso shot with the first heating component and generation of steam with the second heating component or simultaneous provision of hot water with the first heating component and extraction of the first espresso shot with the second heating component.

15. The power management system of claim 12, wherein the mains power is a commercial alternating current (AC) power supply having a predetermined supply voltage, and
   wherein the power available via the mains power is insufficient to simultaneously power the first and second heating components without utilizing power from the energy storage device.

16. A method of controlling provision of power in an appliance for making a beverage, wherein the appliance has a plurality of heating components for heating a liquid, the method comprising the steps of:
   determining whether at least a first function of the appliance has been selected requiring simultaneous operation of a first heating component and a second heating component of the appliance, and upon a positive determination, applying a first portion of mains power to a first heater element of the first heating component, applying power from an energy storage device to a second heater element of the first heating component, and applying at least a second portion of the mains power to the second heating component.

17. The method of claim 16 further comprising the steps of:
   determining whether at least the first function of the appliance has been selected requiring simultaneous operation of the first heating component and the second heating component, and
   upon a positive determination, applying mains power to a third heater element of the second heating component and applying power from the energy storage device to a fourth heater element of the second heating component.

18. The method of claim 16, wherein the first function comprises actions including one of: simultaneous extraction of a first espresso shot with the first heating component and extraction of a second espresso shot with the second heating component simultaneous extraction of the first espresso shot with the first heating component and generation of steam with the second heating component or simultaneous provision of hot water with the first heating component and extraction of the first espresso shot with the second heating component.

19. The method of claim 16, wherein the mains power is a commercial alternating current (AC) power supply having a predetermined supply voltage, and
   wherein the power available via the mains power is insufficient to simultaneously power the first and second heating components without utilizing power from the energy storage device.

* * * * *